United States Patent
Jibbe et al.

(10) Patent No.: US 9,146,726 B2
(45) Date of Patent: Sep. 29, 2015

(54) SYSTEM AND METHOD FOR FIRMWARE UPDATE FOR NETWORK CONNECTED STORAGE SUBSYSTEM COMPONENTS

(75) Inventors: Mahmoud K Jibbe, Wichita, KS (US); Dhishankar Sengupta, Yelachanahalli (IN); Britto Rossario, Bangalore (IN); Senthil Kannan, Reddiarpalayam (IN)

(73) Assignee: NetApp, Inc., Sunnyvale, CA (US)

( * ) Notice: Subject to any disclaimer, the term of this patent is extended or adjusted under 35 U.S.C. 154(b) by 841 days.

(21) Appl. No.: 12/969,607

(22) Filed: Dec. 16, 2010

(65) Prior Publication Data

US 2012/0159142 A1 Jun. 21, 2012

(51) Int. Cl.
G06F 9/445 (2006.01)
G06F 9/44 (2006.01)

(52) U.S. Cl.
CPC ... G06F 8/65 (2013.01); G06F 8/71 (2013.01)

(58) Field of Classification Search
None
See application file for complete search history.

(56) References Cited

U.S. PATENT DOCUMENTS

| | | | |
|---|---|---|---|
| 6,675,258 B1 * | 1/2004 | Bramhall et al. | 711/114 |
| 7,073,017 B2 * | 7/2006 | Yamamoto | 711/103 |
| 7,228,538 B1 * | 6/2007 | Burton et al. | 717/170 |
| 7,343,401 B2 * | 3/2008 | Tachibana et al. | 709/220 |
| 7,380,113 B2 * | 5/2008 | Ebsen et al. | 713/1 |
| 7,577,729 B1 * | 8/2009 | Umbehocker et al. | 709/223 |
| 7,676,666 B2 | 3/2010 | Lambert et al. | |
| 7,702,655 B1 * | 4/2010 | Panelli et al. | 707/600 |
| 7,886,031 B1 * | 2/2011 | Taylor et al. | 709/221 |
| 7,895,428 B2 * | 2/2011 | Boland et al. | 713/2 |
| 7,984,074 B1 * | 7/2011 | Becher et al. | 707/802 |
| 8,429,640 B2 * | 4/2013 | Yin et al. | 717/168 |
| 8,887,144 B1 * | 11/2014 | Marr et al. | 717/168 |
| 8,971,538 B1 * | 3/2015 | Marr et al. | 380/285 |
| 2002/0166027 A1 * | 11/2002 | Shirasawa et al. | 711/114 |
| 2004/0030768 A1 * | 2/2004 | Krishnamoorthy et al. | 709/223 |
| 2004/0148379 A1 * | 7/2004 | Ogura | 709/223 |
| 2004/0230963 A1 * | 11/2004 | Rothman et al. | 717/168 |
| 2004/0255286 A1 * | 12/2004 | Rothman et al. | 717/168 |
| 2005/0027807 A1 * | 2/2005 | Fengler et al. | 709/206 |
| 2005/0188170 A1 * | 8/2005 | Yamamoto | 711/170 |
| 2006/0230165 A1 * | 10/2006 | Zimmer et al. | 709/230 |
| 2007/0169081 A1 * | 7/2007 | Zhao et al. | 717/168 |

(Continued)

OTHER PUBLICATIONS

Shavit, Moshe, Andy Gryc, and Radovan Miucic. Firmware update over the air (FOTA) for automotive industry. No. 2007-01-3523. SAE Technical Paper, 2007.*

(Continued)

*Primary Examiner* — Matthew Brophy
(74) *Attorney, Agent, or Firm* — Haynes and Boone, LLP

(57) ABSTRACT

A system and method for providing firmware update for network connected storage subsystem components is disclosed. In one embodiment, the storage system is registered via a secured process using a client management module of a firmware update management module residing in a client device associated with the storage system. The storage system includes a plurality of storage subsystems. Further, an inventory list including each storage subsystem component in each of the plurality of storage subsystems along with its associated firmware code level is formed by the client management module. Furthermore, the inventory list along with an associated firmware code level of the storage system is stored by a registration management module of the firmware update management module residing in a registration server coupled to the client device via the network.

16 Claims, 4 Drawing Sheets

(56) References Cited

U.S. PATENT DOCUMENTS

| | | | |
|---|---|---|---|
| 2007/0239841 A1* | 10/2007 | Lehrman | 709/217 |
| 2008/0178171 A1* | 7/2008 | Sueyoshi et al. | 717/171 |
| 2009/0113416 A1* | 4/2009 | Bealkowski et al. | 717/177 |
| 2009/0187900 A1* | 7/2009 | Nakamoto | 717/168 |
| 2009/0217163 A1* | 8/2009 | Jaroker | 715/700 |
| 2009/0319652 A1* | 12/2009 | Odenwald et al. | 709/223 |
| 2009/0327727 A1* | 12/2009 | Meijer et al. | 713/170 |
| 2010/0217837 A1* | 8/2010 | Ansari et al. | 709/218 |
| 2010/0218178 A1* | 8/2010 | Sakai | 717/170 |
| 2010/0235433 A1* | 9/2010 | Ansari et al. | 709/203 |
| 2010/0251350 A1* | 9/2010 | Choi | 726/7 |
| 2010/0260066 A1* | 10/2010 | August et al. | 370/254 |
| 2010/0313191 A1* | 12/2010 | Yin et al. | 717/168 |
| 2011/0083129 A1* | 4/2011 | Masaki | 717/175 |
| 2011/0119664 A1* | 5/2011 | Kimura et al. | 717/173 |
| 2011/0239209 A1* | 9/2011 | Kotani et al. | 717/171 |
| 2011/0296404 A1* | 12/2011 | Zhang et al. | 717/178 |
| 2012/0110588 A1* | 5/2012 | Bieswanger et al. | 718/104 |

OTHER PUBLICATIONS

Agrawal, Dakshi, et al. "Policy-based validation of SAN configuration." Policies for Distributed Systems and Networks, 2004. Policy 2004. Proceedings. Fifth IEEE International Workshop on. IEEE, 2004.*

Qiu, Xiangqun, et al. "Reliability and availability assessment of storage area network extension solutions." Communications Magazine, IEEE 43.3 (2005): 80-85.*

* cited by examiner

SYSTEM AND METHOD FOR FIRMWARE UPDATE FOR NETWORK CONNECTED STORAGE SUBSYSTEM COMPONENTS

FIELD OF TECHNOLOGY

Embodiments of the present invention relate to the storage subsystem components. More particularly, embodiments of the present invention relate to firmware updates to network coupled storage subsystem components.

BACKGROUND

A typical storage system can include hundreds or even thousands of storage subsystem components, such as different generic storage components, different original equipment manufacturer (OEM) vendor components and so on. Typically, such storage subsystem components include firmware that contains instructions for execution by a microcontroller. When a firmware update becomes available to one of the storage subsystem components, it can be logically difficult to keep track of which of the storage subsystem components need to be updated, have already been updated, are compatible with the firmware update, and so on. The possibility that commissioned storage subsystem components will have outdated or mismatched firmware may be high. Further, firmware updates may not reach every storage subsystem component in the storage system.

Existing techniques for providing firmware updates include small computer system interface (SCSI), serial port propagation and the like. Further, existing techniques do not provide any structured process for notifying the users of any new releases, patches and fixes available for storage subsystem components. Furthermore, such firmware updates are typically, communicated via the OEM partners and service channels. Although these approaches are in wide use, there are significant disadvantages posed by such arrangements. For example, where personal computer (PC) platforms are utilized, programs have to be written that involve time consuming coding, necessary to make compatible communication between the interconnected storage subsystem components. Under present scenario, generally, maintaining firmware updates in storage systems including hundreds of storage subsystem components is very labor intensive and prone to mishandling and human error, which can result in sub-optimal performance and utilization of storage systems.

SUMMARY

System and method for firmware update for network connected storage subsystem components is disclosed. According to one aspect of the present invention, the method includes registering the storage system via a secured process using a client management module of a firmware update management module residing in a client device associated with the storage system. The storage system includes a plurality of storage subsystems. The storage subsystem includes a generic storage subsystem, an original equipment manufacturer (OEM) storage subsystem, and so on. Further, the method includes forming an inventory list including each storage subsystem component in each of the plurality of storage subsystems along with its associated firmware code level.

Furthermore, the method includes storing the inventory list along with an associated firmware code level of the storage system by a registration management module of the firmware update management module residing in a registration server coupled to the client device via the network for any future required firmware update. Also, The method includes receiving one or more new firmware updates for one or more storage subsystem components by the registration management module, determining whether the one or more storage subsystem components for which the one or more new firmware updates were received are in the registered storage system by the registration management module, if so, updating the firmware associated with the one or more storage subsystem components for which the one or more new firmware updates were received in the storage system by the client management module, and if not, stopping the update process by the client management module.

According to another aspect of the present invention, a non-transitory computer-readable storage medium for providing firmware update to network connected storage subsystem components in a storage system, when executed by a computing device causes the computing device to perform the method described above.

According to yet another aspect of the present invention, the system for firmware update for network connected storage subsystem components includes a storage system including a plurality of storage subsystems. The plurality of storage subsystems includes a plurality of storage subsystem components. The system further includes a client device including a client management module of a firmware update management module. The client device is communicatively coupled to the plurality of storage subsystem components via a private network.

Furthermore, the system includes a registration management server including a registration management module of the firmware update management module coupled to the client device via a public network and a registration storage server coupled to the registration management server. The client management module and the registration management module are operable in combination to perform the method described above.

The methods, and systems disclosed herein may be implemented in any means for achieving various aspects, and other features will be apparent from the accompanying drawings and from the detailed description that follow.

BRIEF DESCRIPTION OF THE DRAWINGS

Various embodiments are described herein with reference to the drawings, wherein.

Figure 1:
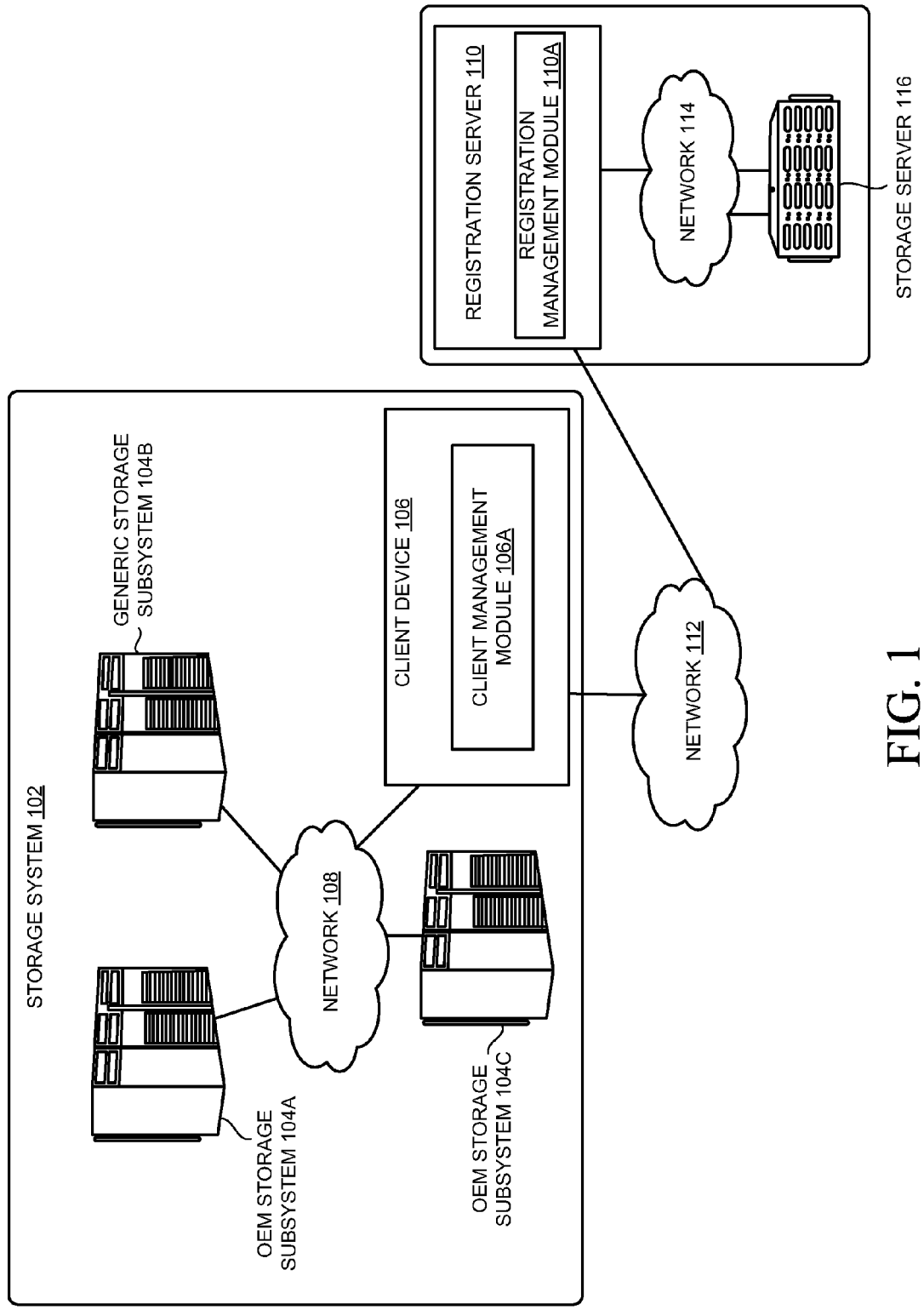
FIG. 1 illustrates a storage system including the firmware update management system, according to an one embodiment.

The drawings described herein are for illustration purposes only and are not intended to limit the scope of the present invention in any way.

DETAILED DESCRIPTION

System and method for providing firmware update to network connected storage subsystem components is disclosed. In the following detailed description of the embodiments of the present invention, reference is made to the accompanying drawings that form a part hereof, and in which are shown by way of illustration specific embodiments in which the present invention may be practiced. These embodiments are described in sufficient detail to enable those skilled in the art to practice the present invention, and it is to be understood that other embodiments may be utilized and that changes may be made without departing from the scope of the present invention. The following detailed description is, therefore, not to be taken in a limiting sense, and the scope of the present invention is defined by the appended claims.

The present invention describes software, firmware, and other BIOS level update profiler, wherein a storage system including storage subsystems can be registered to a central registration server. The registration server will collect storage subsystem inventory and compare it with the recommended inventory. For example, the storage subsystem inventory refers to storage subsystem components with the firmware/BIOS/software release details. In case of changes required, the registration server will send a firmware update request based on the comparison. This request needs user permission for proceeding with online/offline firmware updates of the storage subsystem components as required.

Further, the remote firmware update is executed making sure that there is no impact to the host input/output (IO). The firmware updates can either be prompted for a user confirmation or be in a silent mode without a necessity to get the user confirmation. This decision can be taken by a client management module of a firmware update management module in the client device. For better security, a user credential is available to allow the client management module to activate this remote firmware update feature.

For example, the present invention registers the storage subsystem with a unique SSID (storage subsystem ID) in a registration server for firmware updates, so multiple storage subsystems with same model can be registered and tracked uniquely. Further, the present invention notifies users on new firmware updates even though the storage subsystem may not be registered, which helps a user to understand the need and opt for the registration. The present invention uses a web server interface with a file transfer protocol (FTP) background in secure channel registration and firmware code updates.

Furthermore, the present invention compares the complete storage subsystem inventory code levels to recommended inventory code levels. The present invention also compares and passes firmware updates based on original equipment manufacturer (OEM) customization levels for any storage subsystem inventory.

Also, the present invention schedules the firmware updates without user intervention and notifies a user on the online/offline form of update and the reasons to update. Furthermore, the present invention sets user level permission to carry out the firmware updates in a scheduled manner. In addition, the present invention carries out multiple such updates to different storage subsystems at different locations from a central user administration. The present invention ensures a secure connection through internet for executing all the above methods.

The terms "subsystem" and "storage subsystem" are used interchangeably throughout the document. Further, the terms "subsystem component" and "storage subsystem component" are used interchangeably throughout the document. Furthermore, the terms "firmware" and "firmware code level" are used interchangeably throughout the document. The term "management software" refers to a firmware update management module having a client management module residing in the client device and a registration management module residing in the management server.

FIG. 1 illustrates a firmware update management system 100, according to one embodiment. Particularly, FIG. 1 illustrates a storage system 102 including a plurality of storage subsystems connected to a client device 106 via a network 108. For example, the plurality of storage subsystems includes but not limited to original equipment manufacturer (OEM) subsystems 104A and 104C and a generic storage subsystem 104B. Further, each of the storage subsystems includes a plurality of subsystem components.

The client device 106 includes a client management module 106A of a firmware update management module. The client device 106 is communicatively coupled to the plurality of storage subsystem components of the storage subsystems 104A-C via the network 108. The network 108 may be a private network and includes one of the Internet, storage area network (SAN) and so on. Further, the network 108 can be located anywhere in the world.

The system 100 also includes a registration management server 110, including a registration management module 110A of the firmware update management module, coupled to the client device via a network 112. For example, the network 112 may be a public network and includes but not limited to the Ethernet. The system 100 further includes a storage server 116 coupled to the registration management server 110 via a private network 114.

In operation, the client management module 106A registers the storage system 102 via a secured process. Further, the client management module 106A forms an inventory list including each storage subsystem component in each of the plurality of storage subsystems 104A-C along with its associated firmware code level. Furthermore, the registration management module 110A stores the inventory list along with an associated firmware code level of the storage system 102 upon receiving the formed inventory list from the client management module 106A for any future required firmware update. In these embodiments, the registration management module 110A stores the inventory list along with an associated firmware code level in the storage server 116. The registration process is explained in greater detail in FIG. 3.

Further in operation, the registration management module 110A upon receiving one or more new firmware updates for one or more storage subsystem components determines whether the one or more storage subsystem components for which the one or more new firmware updates were received are in the registered storage system. In one embodiment, the client management module 106A updates the firmware associated with the one or more storage subsystem components for which the one or more new firmware updates were received in the storage system 102 if the one or more storage subsystem components for which the one or more new firmware updates were received are in the registered storage system. The client management module 106A stops the update process if the one or more storage subsystem components for which the one or more new firmware updates were received are not in the registered storage system.

Furthermore in operation, for updating the firmware associated with the one or more storage subsystem components, the registration management module 110A determines whether the received one or more new firmware updates are already installed in the one or more storage subsystem components.

In these embodiments, the client management module 106A stops the update process if the one or more new firmware updates are already installed in the one or more storage subsystem components. Further, the client management module 106A updates the firmware associated with the one or more storage subsystem components for which the one or more new firmware updates were received in the storage system if the one or more new firmware updates are not already installed in the one or more subsystem components.

Furthermore, the client management module 106A updates the firmware associated with at least some storage subsystem components and stops the update process for remaining storage subsystem components if the one or more new firmware updates are not already installed in the at least some storage subsystem components. The updating process is explained in greater detail in FIG. 4.

In yet another embodiment, the registration management module 110A notifies each client device 106 having a particular subsystem component when a new firmware update associated with the particular subsystem component is released. In these embodiments, the client management module 106A updates the firmware associated with the particular subsystem component in each client device 106.

Figure 2:
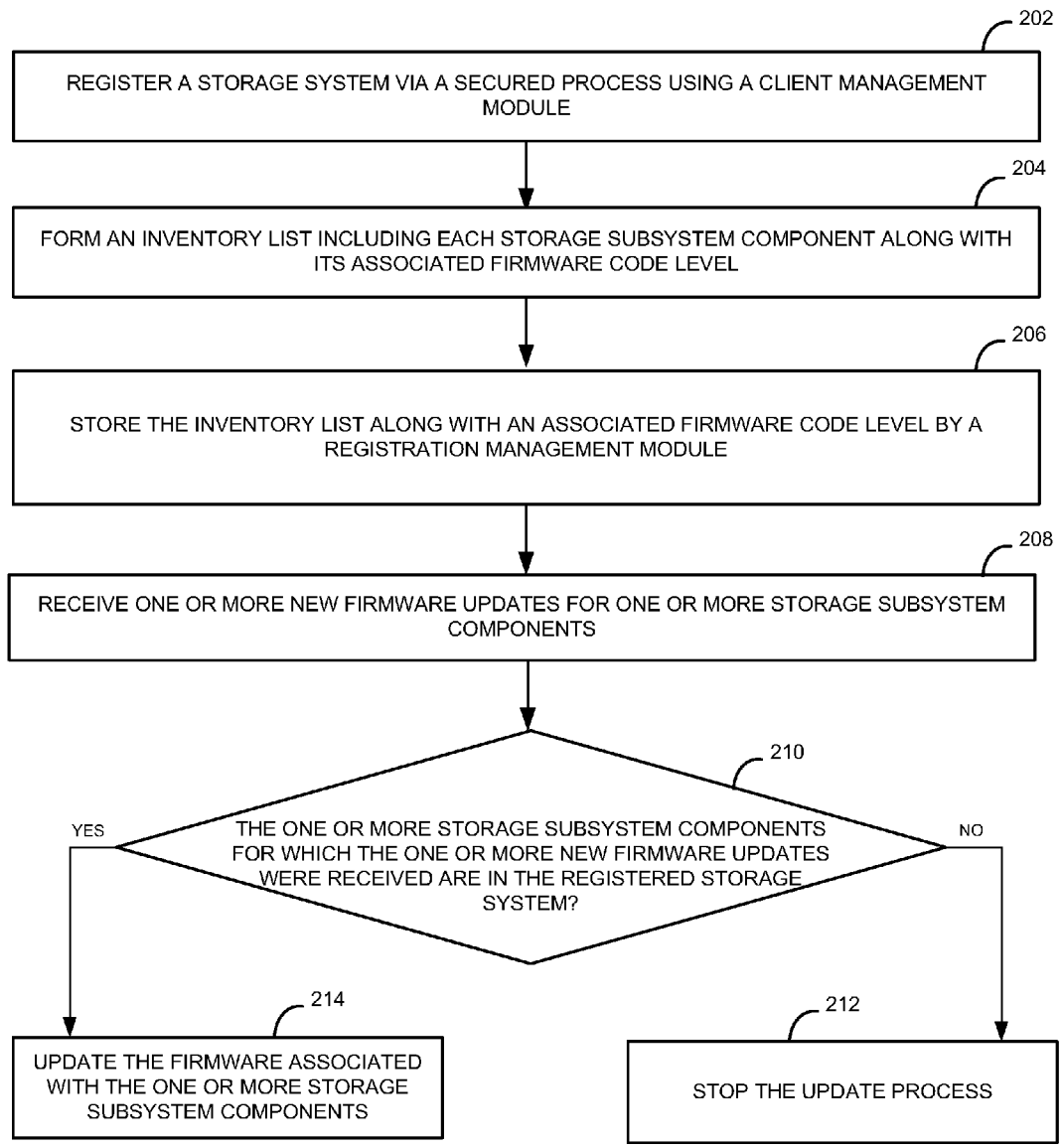
FIG. 2 illustrates a method for providing firmware update to network connected storage subsystem components, according to one embodiment.

FIG. 2 illustrates a method 200 for providing firmware update to network connected storage subsystem components in a storage system, according to one embodiment. For example, the storage system includes a plurality of storage subsystems such as a generic storage subsystem and/or an original equipment manufacturer (OEM) storage subsystem.

At block 202, the storage system is registered via a secured process using a client management module. In one example embodiment, the client management module includes a part of a firmware update management module and resides in a client device associated with the storage system. The storage system is registered using extensible markup language (XML) information over hypertext transfer protocol secure (HTTPS). In one example embodiment, the registration process involves using a unique ID which is a combination of worldwide name (WWN) and the serial number of the storage subsystem.

At block 204, an inventory list including each storage subsystem component in each of the plurality of storage subsystems along with its associated firmware code level is formed by the client management module upon completing the registration of the storage system. In these embodiments, firmware update parameters associated with each storage subsystem component in the inventory list are determined upon receiving the inventory list from the client management module by the registration management module. Further, the determined firmware update parameters are compared with recommended firmware update parameters for each storage subsystem component by the registration management module. Furthermore, the firmware for each storage subsystem component is updated based on the outcome of the comparison. For example, the firmware update parameters are selected from the group consisting of a component type, firmware code level and associated software and hardware information.

At block 206, the inventory list along with an associated firmware code level of the storage system is stored by the registration management module. The registration management module includes a part of the firmware update management module and resides in a registration server coupled to the client device via the network. In one example embodiment, the inventory list along with the associated firmware code level of the storage system is stored upon receiving the formed inventory list from the client management module for any future required firmware update. The registration process is explained in detail in FIG. 3.

At block 208, one or more new firmware updates are received for one or more storage subsystem components by the registration management module. The new firmware updates include details associated with firmware, BIOS and/or software releases. In other words, the firmware updates are used to update storage subsystem components having at least one of a firmware, basic input/output system (BIOS), non-volatile random access memory (NVRAM), management software and hot fixes. At block 210, a check is made by the registration management module to determine whether the one or more storage subsystem components for which the one or more new firmware updates were received are in the registered storage system. If the one or more storage subsystem components for which the one or more new firmware updates were received are not in the registered storage system, then the update process is stopped by the client management module at block 212.

At block 214, if the one or more storage subsystem components for which the one or more new firmware updates were received are in the registered storage system, then the firmware associated with the one or more storage subsystem components for which the one or more new firmware updates were received is updated in the storage system by the client management module. Further, the inventory list along with the firmware code level is substantially periodically updated by reviewing each storage subsystem component in the storage system.

In one embodiment, the firmware associated with the one or more storage subsystem components is updated by determining whether the received one or more new firmware updates are already installed in the one or more storage subsystem components by the registration management module. If the one or more new firmware updates are already installed in the one or more storage subsystem components, then the update process is stopped by the client management module. If the one or more new firmware updates are not already installed in the one or more subsystem components, then the firmware associated with the one or more storage subsystem components for which the one or more new firmware updates were received in the storage system is updated by the client management module.

If the one or more new firmware updates are not installed in at least some storage subsystem components, then the firmware associated with the at least some storage subsystem components is updated and the update process for remaining storage subsystem components is stopped by the client management module.

In another embodiment, when a new firmware update associated with a particular subsystem component is released then each client device having the particular subsystem component is notified. Further, the firmware associated with the particular subsystem component is updated in each client device. The update process is explained in greater detail with respect to FIG. 4.

In yet another embodiment, the firmware associated with the one or more storage subsystem components is updated by transferring, by the client management module, queued IO requests waiting for a particular storage subsystem component to a redundant storage subsystem component, when the client device initiates a remote update for the particular storage subsystem component during IO process. Further, the remote update to the particular storage subsystem component is performed by the client management module. Furthermore, the queued IO requests are transferred back to the particular storage subsystem component from the redundant storage subsystem component by the client management module upon updating the particular storage subsystem component.

Figure 3:
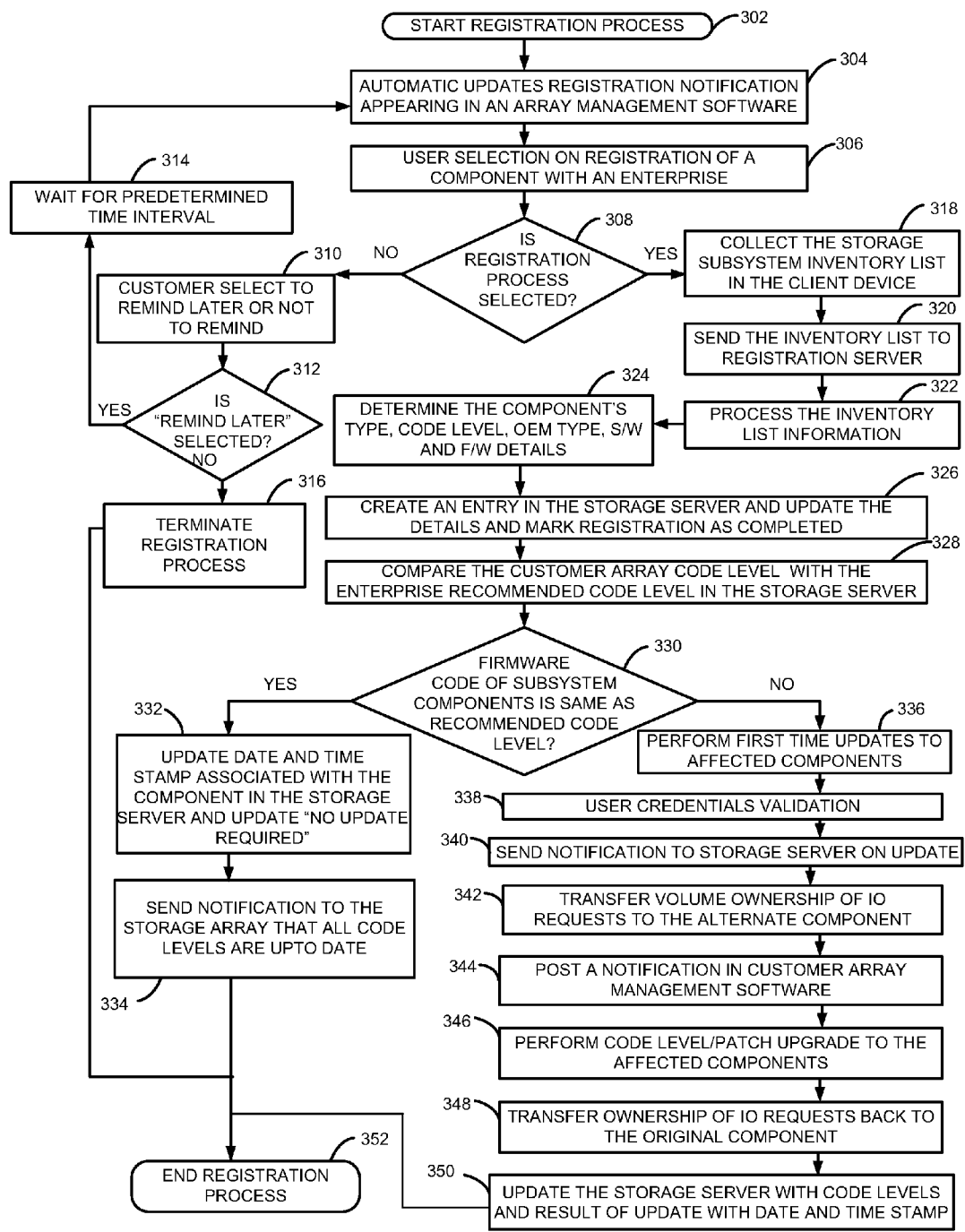
FIG. 3 is a flowchart illustrating in detail a registration process used in the method shown in FIG. 2, according to one embodiment.

FIG. 3 is a flowchart 300 illustrating in detail a registration process used in the method shown in FIG. 2, according to one embodiment. At block 302, the registration process for registering a storage system with a centralized registration server (e.g., the registration server 110 of FIG. 1) is started. At block 304, automatically updated registration notification is appeared in array management software or a client management module of a firmware update management module residing in a client device. In these embodiments, storage subsystems, when managed through the management software triggers a requirement to register the storage subsystem components with the registration server. For example, the user is allowed to receive regular and required updates for the storage subsystem components. In other words, the updates and releases will be made available only for the registered storage subsystems.

At block 306, the user may be allowed to select registration of the storage subsystem components with an enterprise including the registration server. At block 308, a check is made to determine whether the registration process is selected by the user. If the registration process is not selected, the user may be allowed to select an option to remind the registration process later or not to remind the registration process at block 310. At block 312, a check is made to determine whether the remind later option is selected. If the remind later option is not selected, the registration process is terminated at block 316 and the registration process ends as shown in block 342.

If the remind later option is selected at block 312, then the registration process waits for a predetermined time interval as shown in block 314. The predetermined time interval can include seconds, minutes, hours, days, and/or months. With respect to blocks 308-314, if the user decides not to register the storage subsystem components, the user will be reminded of the unregistered storage subsystem components every time the management software (i.e., the client management module 106A) adds a new storage subsystem component or receives any updates for existing registered storage subsystem components.

If the registration process is selected at block 308, the inventory list including each storage subsystem component in each storage subsystem along with its associated firmware code level in the client device is collected by the client management module or the management software at block 318. At block 320, the inventory list including each storage subsystem component along with its associated firmware code level is sent to the registration server. In one example embodiment, the registration server stores the inventory list in a storage server connected to the registration server via a network.

At block 322, the inventory list is processed by the registration management module of the registration server. At block 324, a type, code level, OEM type, software and/or firmware details of the storage subsystem components are determined. At block 326, an entry in the storage server is created and the determined type, code level, OEM type, software and/or firmware details of the storage subsystem components are updated in the created entry. Upon updating the details, the registration process is marked as completed.

With respect to blocks 318-326, once the subsystem components are registered with the registration server, all communication between the client device [i.e., user end] and registration server will be secure. For example, the communication can be XML information over HTTPS (or different advanced options can be used as actual implementation is done).

In one example embodiment, the registration process involves registering a unique ID with the registration server. The unique ID refers to a storage subsystem ID (SSID) which is a combination of WWN (World Wide Name) and the serial number of the storage subsystem component. During registration of the SSID, the registration server will also pull information on entire storage subsystem inventory list along with the associated code levels. This information will be stored in a storage server connected to the registration server via a private network. Depending on the brand of the storage subsystem, the storage subsystem is categorized under specific OEM storage subsystems or generic storage subsystems thereby managing OEM specific releases or fixes explicitly.

An example inventory list is shown in table 1 below:

TABLE 1

| | |
|---|---|
| SSID | 20488839ueidoeiey77737u373 |
| Controller Firmware | 00.00.00.00 |
| FPGA Firmware | 11.11.11.11 |
| Drive Firmware | 1234 |
| Controller BIOS | 1234 |
| Management Software | A0 |
| Etc | B0 |

At block 328, the inventory list including each storage subsystem component along with its associated firmware code level is compared with the recommended code level in the storage server by the registration management module. At block 330, a check is made to determine whether the firmware code level associated with the storage subsystem components is same as the recommended code level in the storage server. If the firmware code level associated with the storage subsystem components is same as the recommended code level, then the date and time stamp associated with the storage subsystem component is automatically updated in the registration server and further "no update required" is updated at block 332. At block 334, a notification indicating all code levels are up to date is sent to the storage server and the registration process ends as shown in block 352.

If the firmware code level associated with the storage subsystem components is not same as the recommended code level at block 330, first time updates are performed to the affected storage subsystem components at block 336. In one example embodiment, the first time update may be performed to update the firmware code level associated with the storage subsystem components (i.e., inventory details) with the current firmware updates available after registration at that instance. At block 338, the user credentials required to activate the first time updates for the storage subsystem components are validated. At block 340, a notification regarding the first time updates is sent to the storage server. At block 342, queued IO requests waiting for a particular affected storage subsystem component are transferred by the client management module to a redundant storage subsystem component, when the client device initiates a remote update for the particular affected storage subsystem component during processing of the IO requests.

At block 344, a notification regarding the transferred IO requests is posted in the customer array management software or the client management module. At block 346, the remote update (i.e., firmware code level or patch level update) to the particular affected storage subsystem component is performed by the client management module.

At block 348, the queued IO requests are transferred back to the particular affected storage subsystem component from the redundant storage subsystem component by the client management module upon updating the particular affected storage subsystem component. At block 350, the storage server is updated with code levels and result of update is updated with date and time stamp. Upon updating the storage server, the registration process ends as shown in block 352.

Figure 4:
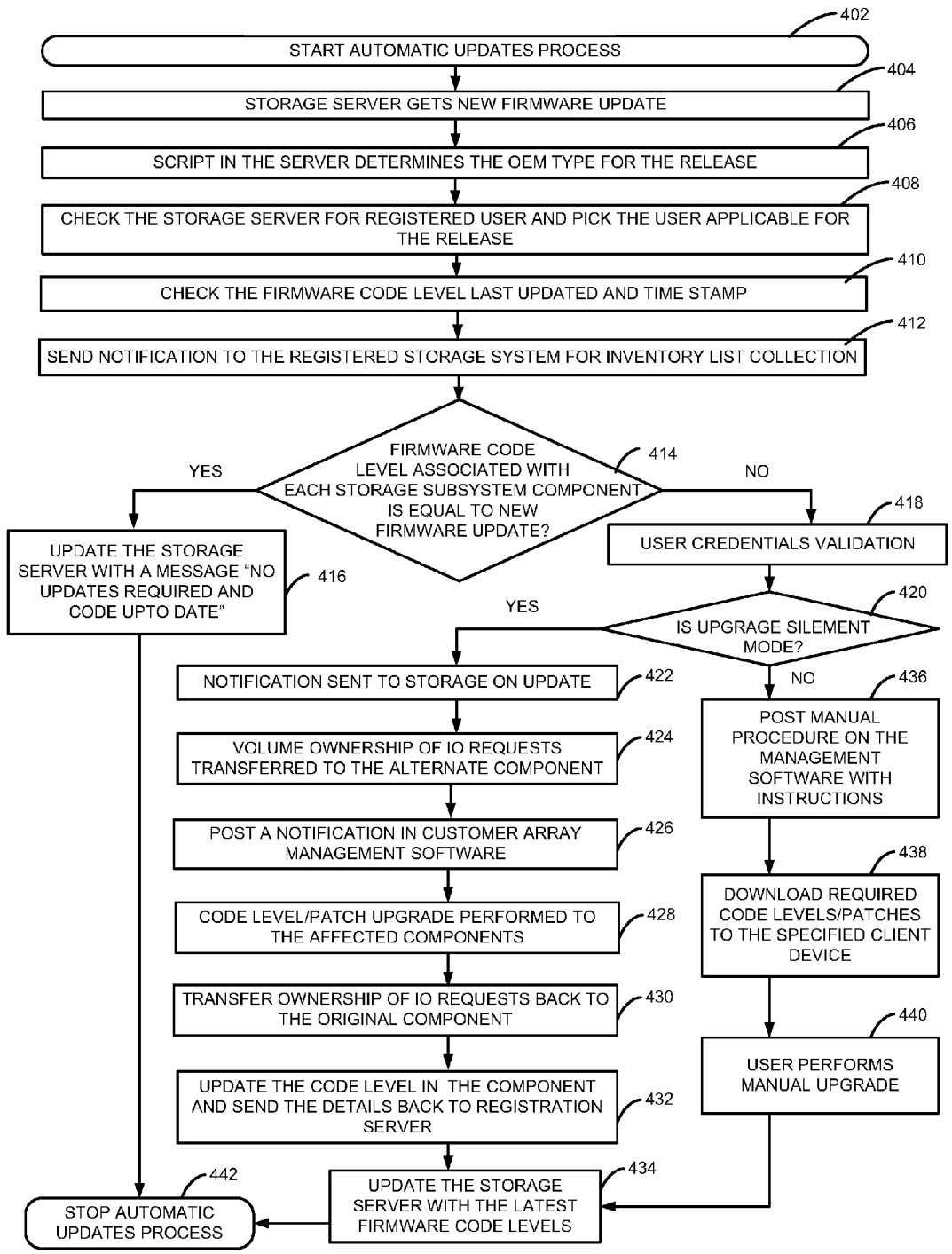
FIG. 4 is a flowchart illustrating a firmware update process deployed in the method shown in FIG. 2, according to one embodiment.

FIG. 4 is a flowchart 400 illustrating a firmware update process deployed in the method shown in FIG. 2, according to one embodiment. In one example embodiment, after the first time update as mentioned above with respect to blocks 336-340 of FIG. 3, the next update will be triggered based on any changes/updates in the firmware code level of a storage subsystem component (i.e., an enterprise sends a new firmware update). In this case, the client management module and the registration management module in combination notifies a user of a client device and downloads the new firmware update automatically since the storage system is already registered and storage system subcomponent is changed.

At block 402, an automatic update process for updating firmware code level associated with the storage subsystem components is started. At block 404, a new firmware update for one or more storage subsystem components is received in the storage server. At block 406, the OEM storage subsystem component type for the release of the new firmware update is determined by the script in the storage server.

At block 408, the storage server is checked for registered storage subsystem components and the client device applicable for the release of the new firmware update is selected. At block 410, the last updated firmware code level and time stamp for the one or more storage subsystem components is checked. At block 412, a notification is sent to the client device associated with the registered storage system for collecting the inventory list associated with each storage subsystem component.

At block 414, a check is made to determine whether the firmware code level associated with each storage subsystem component is equal to the new firmware update. In one example embodiment, the registration server automatically checks whether the new firmware update is already installed in each storage system component. If the firmware code level associated with each storage subsystem component is equal to the new firmware update, then the storage server is updated with a message "no updates required and firmware code level is up to date" at block 416. Further, the automatic update process is ended as shown in block 442.

If the firmware code level associated with each storage subsystem component is not equal to the new firmware update, the user credentials required to activate the new firmware updates for the storage subsystem components are validated at block 418. At block 420, a check is made to determine whether upgrading the new firmware will be performed in silent mode or with user confirmation based on the complexities involved in the new firmware update. In these embodiments, the silent mode refers to automatically updating the new firmware in the storage subsystem components by the client management module without user consent/intervention.

If upgrading the new firmware is in silent mode, a notification regarding the new firmware updates is sent to the storage server at block 422. At block 424, queued IO requests waiting for a particular storage subsystem component are transferred by the client management module to a redundant storage subsystem component, when the client device initiates the new firmware updates for the particular storage subsystem component during processing of the IO requests.

At block 426, a notification regarding the transferred IO requests is posted in the customer array management software or the client management module. At block 428, the new firmware updates (i.e., firmware code level or patch level update) to the particular storage subsystem component is performed by the client management module.

At block 430, the queued IO requests are transferred back to the particular storage subsystem component from the redundant storage subsystem component by the client management module upon updating the particular storage subsystem component. At block 432, the storage subsystem component is updated with code levels and result of update is sent to the registration server. At block 434, the storage server is updated with new firmware code levels and result of update is updated with date and time stamp. In one example embodiment, the information regarding the current firmware code level and the updated firmware code level may be registered in the storage server once the update is completed. Upon updating the storage server, the registration process ends as shown in block 442.

If upgrading the new firmware is with the user confirmation at block 420, a manual procedure with instructions for updating the new firmware code levels is posted on the client management module or client management software at block 436. At block 438, required new firmware code levels/patch levels are downloaded to the client device by the user. At block 440, manual upgrading of the software subsystem components is performed by the user using the downloaded firmware code levels and the process goes to block 434 for storing the updated with new firmware code levels in the storage server and the process ends as shown in block 442.

In accordance with above described embodiments with respect to FIG. 4, the storage server connected to the registration server via a private network hosts all patch releases, bug fixes and so on. The storage server works as a repository machine and located on the private network.

Each time, when there is a new release or a bug fix for a particular hardware, the registration management module compares the new release or the bug fix with the inventory list saved under the specific OEM/generic database (e.g., the storage server) associated with the registration server. In one example embodiment, the comparison logic may pick each storage subsystem component in the inventory list and compare it with the updated version for that storage subsystem component in the repository. This comparison will only be done in case of any new firmware update release or any patch release for already deployed hardware/products.

For example, when a patch or any new firmware update releases which needs to be updated to the OEM specific storage subsystems, the registration management module notifies the client device with simple pop-up messages informing of the new firmware update. At this point, the user associated with the client device can decide not to do the updates immediately and schedule it appropriately. In such situations, the user will be reminded in a predetermined time intervals such as once in a week, 3 times a month and so on and so forth, till the user agrees to go for the updates.

In another example embodiment, when the user agrees to go for the updates, the registration management module may re-establish a secure connection over the Internet between the client device and the registration server and send the required files onto the client device. Once the download is complete, the installation process will start from the client device itself provided the client management module is open and still managing the registered storage subsystems. Thus, the user will always be running most up-to-date firmware code levels on the storage subsystem components associated with the enterprise.

Further, the host IO during remote updates are handled as follows:

1. User credentials are required to activate the remote updates (e.g., custom firmware (CFW), drive firmware, patches, and ESM firmware updates) for the storage subsystems of the client device. This step may ensure the security at the user level.

2. Based on the user confirmation the client device executes the remote updates either with a prompt for user confirmation on any updates (or) in a silent mode without user intervention. This may be decided by the client management module of the client device based on the complexities involved in the update. This step may ensure off loading user intervention with option for "silent" remote update.
3. During host IO when the client device initiates a remote update, the notification is sent to the storage subsystem.
4. The IOs processed through the current storage subsystem component is completed.
5. The queued IO waiting for the storage subsystem component (e.g., storage array controller/drive enclosure module/disk drives/etc) is transferred to an alternate/redundant storage subsystem component.
6. The alternate/redundant storage subsystem component will be servicing the IO till the new update is activated in the respective storage subsystem component.
7. During this short period, the logical unit number (LUN) involved in IO is owned by the alternate/redundant subsystem component (e.g., storage array controller, drive enclosure module, etc).
8. Once the storage subsystem component is activated with the new firmware update, the steps from 4 to 6 are carried out to the alternate/redundant storage subsystem component.
9. Once both the storage subsystem component and alternate/redundant storage subsystem component are active with the new updates, the LUNs involved in the IO is redistributed with proper LUN ownership for processing the IO back to their original states.

Further, the use of methods and systems described in FIGS. 1 through 4 can be detected using storage subsystem client code or client management module for inventory registration and code updates. Furthermore, the use of methods and systems can be detected using scheduler inside storage subsystem client code for scheduled code updates on subsystem inventory. Also, the use of methods and systems can be detected using storage subsystem client code for multiple subsystem code updates.

The above described methods and systems may update notification in the client management module of the client device. Further, the above described methods and systems may send automatic notification on new software or firmware release even for unregistered storage subsystems via broadcast to the client device through Internet. The above described methods and systems may provide a one click software update option which enables to click the notification to upgrade the components listed.

The above described methods and systems may provide summary of updates and components affected. The above described methods and systems may also provide an OEM based update option which enables to update storage subsystem components from a specific vendor. For example, a typical customer environment includes a multiple vendor storage subsystems, where the OEM based update option may allow the registration management module to only target the specific OEM/Vendor storage subsystems which require an updated software or firmware code levels.

The above described methods and systems may schedule or plan updates during the maintenance window. The above described methods and systems may enable a single client device to upgrade multiple subsystem components at one shot.

In various embodiments, the methods and systems described in FIGS. 1 through 4 may eliminate the requirement of support personnel to visit the site requiring upgrade and to deploy hardware on a client device. The methods and systems may reduce cycle time in finding the storage subsystem component requiring upgrade and manually upgrading them. The methods and systems may increase the supportability aspect of the storage subsystem component. In this case, the storage subsystem can be always up to date.

Further, the methods and systems may reduce the patch release and upgrade cycle and saves cost, since this can now be done online. The deployed product is always up to date with the recommended software levels. The methods and systems may avoid wrong updates and damage caused by it. The methods and systems may provide an on time patch/code level update which eliminates the possibility of field escalation due to outdated code levels and already resolved field issues. The above described methods and systems may be used where software point releases for storage controllers become seamless with automatically updating.

An article comprising a non transitory computer readable storage medium having instructions thereon which when executed by a computer, cause the computer to perform the above described method. The method described in the foregoing may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

Although the present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for providing firmware update to network connected storage subsystem components in a storage system, comprising:

registering the storage system via a secured process using a client management module of a firmware update management module residing in a client device associated with the storage system, wherein the storage system includes a plurality of storage subsystem components;

forming an inventory list including each storage subsystem component in each of the plurality of storage subsystems along with its associated firmware code level upon completing the registration of the storage system by the client management module;
storing the inventory list along with an associated firmware code level of the storage system by a registration management module of the firmware update management module residing in a registration server coupled to the client device via the network upon receiving the formed inventory list from the client management module for any future required firmware update;
receiving one or more new firmware updates for one or more storage subsystem components by the registration management module;
determining whether the one or more storage subsystem components for which the one or more new firmware updates were received are in the registered storage system by the registration management module; and
updating the firmware associated with ones of storage subsystem components for which the one or more new firmware updates were received in the storage system by the client management module and which are determined to be in the registered storage system; and
providing a notification for ones of the storage subsystem components for which the one or more new firmware updates were received in the storage system by the client management module and which are not registered.

2. The method of claim 1, wherein updating the firmware associated with the one or more storage subsystem components comprises:
determining whether the received one or more new firmware updates are already installed in the one or more storage subsystem components by the registration management module;
if the one or more new firmware updates are already installed in the one or more storage subsystem components, then stopping the update process by the client management module;
if the one or more new firmware updates are not already installed in the one or more subsystem components, then updating the firmware associated with the one or more storage subsystem components for which the one or more new firmware updates were received in the storage system by the client management module; and
if the one or more new firmware updates are not already installed in at least some storage subsystem components, then updating the firmware associated with the at least some storage subsystem components and stopping the update process for remaining storage subsystem components by the client management module.

3. The method of claim 1, wherein updating the firmware associated with the one or more storage subsystem components comprises:
notifying each client device having a particular subsystem component when a new firmware update associated with the particular subsystem component is released; and
updating the firmware associated with the particular subsystem component in each client device.

4. The method of claim 1, further comprising:
substantially periodically updating the inventory list along with the firmware code level by reviewing each storage subsystem component in the storage system.

5. The method of claim 1, wherein updating the firmware associated with the one or more storage subsystem components comprises:
transferring, by the client management module, queued IO requests waiting for a particular storage subsystem component to a redundant storage subsystem component, when the client device initiates a remote update for the particular storage subsystem component during JO process;
performing, by the client management module, the remote update to the particular storage subsystem component; and
transferring back, by the client management module, the queued IO requests to the particular storage subsystem component from the redundant storage subsystem component upon updating the particular storage subsystem component.

6. The method of claim 1, wherein registering the storage system via the secured process comprises:
registering the storage system using XML information over hypertext transfer protocol secure (HTTPS).

7. The method of claim 1, wherein forming the inventory list including each storage subsystem component in each of the plurality of storage subsystems along with its associated firmware code level upon completing the registration of the storage system by the client management module comprises:
determining firmware update parameters associated with each storage subsystem component in the inventory list upon receiving the inventory list from the client management module by the registration management module;
comparing the determined firmware update parameters with recommended firmware update parameters for each storage subsystem component in the inventory list by the registration management module; and
updating the firmware for each storage subsystem component in the inventory list based on the outcome of the comparison.

8. The method of claim 7, wherein the firmware update parameters are selected from the group consisting of a component type, firmware code level and associated software and hardware information.

9. The method of claim 1, wherein each storage subsystem comprises a subsystem selected from the group consisting of a generic storage subsystem and an original equipment manufacturer (OEM) storage subsystem.

10. A non-transitory computer-readable storage medium for providing firmware update to network connected storage subsystem components in a storage system, having instructions that, when executed by a computing device cause the computing device to:
register the storage system via a secured process using a client management module of a firmware update management module residing in a client device associated with the storage system, wherein the storage system includes a plurality of storage subsystem components;
form an inventory list including each storage subsystem component in each of the plurality of storage subsystems along with its associated firmware code level upon completing the registration of the storage system by the client management module;
store the inventory list along with an associated firmware code level of the storage system by a registration management module of the firmware update management module residing in a registration server coupled to the client device via the network upon receiving the formed inventory list from the client management module for any future required firmware update;
receiving one or more new firmware updates for one or more storage subsystem components by the registration management module;
determining whether the one or more storage subsystem components for which the one or more new firmware updates were received are in the registered storage system by the registration management module; and updating the firmware associated with ones of storage subsystem components for which the one or more new firmware updates were received in the storage system by the client management module and which are determined to be in the registered storage system; and providing a notification for ones of the storage subsystem components for which the one or more new firmware updates were received in the storage system by the client management module and which are not registered.

11. The non-transitory computer-readable storage medium of claim 10, wherein updating the firmware associated with the one or more storage subsystem components comprises:

determining whether the received one or more new firmware updates are already installed in the one or more storage subsystem components by the registration management module;

if the one or more new firmware updates are already installed in the one or more storage subsystem components, then stopping the update process by the client management module;

if the one or more new firmware updates are not already installed in the one or more subsystem components, then updating the firmware associated with the one or more storage subsystem components for which the one or more new firmware updates were received in the storage system by the client management module; and if the one or more new firmware updates are not already installed in at least some storage subsystem components, then updating the firmware associated with the at least some storage subsystem components and stopping the update process for remaining storage subsystem components by the client management module.

12. A system for firmware update for network connected storage subsystem components, comprising:

a storage system having one or more processors and including a plurality of storage subsystems, wherein each of the plurality of storage subsystems includes a plurality of storage subsystem devices;

a client device having a processor and including a client management module of a firmware update management module, wherein the client device is communicatively coupled to the plurality of storage subsystem devices via a private network;

a registration management server device having a processor and including a registration management module of the firmware update management module coupled to the client device via a public network; and a registration storage server device having a processor and coupled to the registration management server device, wherein the client management module registers the storage system via a secured process, wherein the client management module forms an inventory list including each storage subsystem device in each of the plurality of storage subsystems along with its associated firmware code level upon completing the registration of the storage system, and wherein the registration management module stores the inventory list along with an associated firmware code level of the storage system in the registration storage server upon receiving the formed inventory list from the client management module for any future required firmware update, wherein the registration management module upon receiving one or more new firmware updates for one or more storage subsystem devices determines whether the one or more storage subsystem devices for which the one or more new firmware updates were received are in the registered storage system, and the client management module then updates the firmware associated with ones of the storage subsystem devices for which the one or more new firmware updates were received in the storage system and which are in the registered storage system, and the client management module further provides a notification for ones of the storage subsystem devices for which the one or more new firmware updates were received in the storage system and which are not registered.

13. The system of claim 12, wherein the registration management module determines whether the received one or more new firmware updates are already installed in the one or more storage subsystem devices, then the client management module is configured to:

stop the update process if the one or more new firmware updates are already installed in the one or more storage subsystem devices;

update the firmware associated with the one or more storage subsystem devices for which the one or more new firmware updates were received in the storage system if the one or more new firmware updates are not already installed in the one or more subsystem devices; and update the firmware associated with at least some storage subsystem devices and stopping the update process for remaining storage subsystem devices if the one or more new firmware updates are not already installed in the at least some storage subsystem devices.

14. The system of claim 12, wherein the registration management module notifies each client device having a particular subsystem device when a new firmware update associated with the particular subsystem device is released, and the client management module then updates the firmware associated with the particular subsystem device in each client device.

15. The system of claim 12, wherein the client management module is further configured to:

transfer queued IO requests waiting for a particular storage subsystem device to a redundant storage subsystem device, when the client management module initiates a remote update for the particular storage subsystem device during JO process;

perform the remote update to the particular storage subsystem device; and transfer back the queued IO requests to the particular storage subsystem device from the redundant storage subsystem device upon updating the particular storage subsystem device.

16. The system of claim 12, wherein each storage subsystem comprises a subsystem selected from the group consisting of a generic storage subsystem and an original equipment manufacturer (OEM) storage subsystem.

* * * * *